Figure 1:
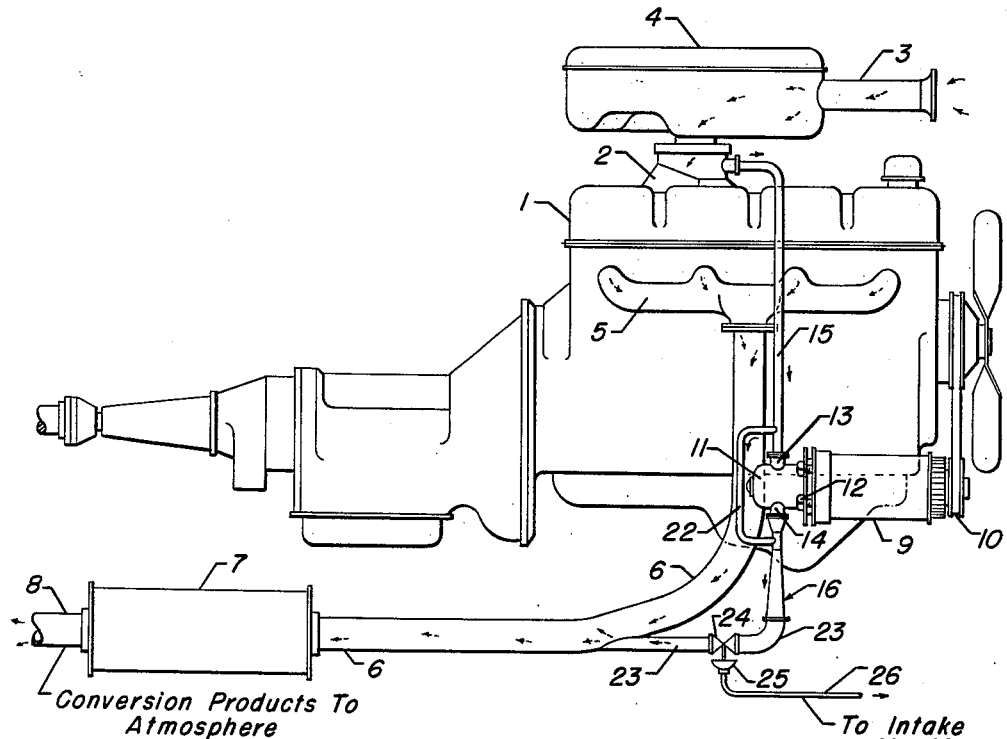

Conversion Products To Atmosphere

To Intake Manifold

INVENTOR:
Robert J. J. Hamblin

BY:
Chester J. Giuliani
Philip T. Liggett
ATTORNEYS

United States Patent Office 3,082,597
Patented Mar. 26, 1963

3,082,597
APPARATUS FOR INJECTING SECONDARY AIR INTO ENGINE EXHAUST GASES AND FOR OTHER USES
Robert J. J. Hamblin, Chicago, Ill., assignor to Universal Oil Products Company, Des Plaines, Ill., a corporation of Delaware
Filed June 26, 1961, Ser. No. 119,463
1 Claim. (Cl. 60—30)

This invention relates to the conversion of engine exhaust gases and more particularly it is directed to apparatus for injecting secondary air into the exhaust gas stream emanating from an internal combustion engine.

The removal of certain noxious components from vehicular exhaust gases is considered to be of importance at the present time. The unavoidably incomplete combustion of hydrocarbon fuels by the gasoline or diesel engine results in the generation of substantial amounts of unburned hydrocarbons and other undesirable waste products which are released to the atmosphere through the exhaust line. With the ever-increasing concentration of automobiles, particularly in urban areas, the resultant accumulation of these undesirable products in the atmosphere may reach high proportions. These combustion products are known to react with atmospheric oxygen under the influence of sunlight to produce smog. Such waste products include, for example, saturated and unsaturated hydrocarbons, carbon monoxide, aromatics, partially oxygenated hydrocarbons such as aldehydes, ketones, alcohols and acids, as well as oxides of nitrogen and sulfur. Methods for converting vehicular exhaust gases to harmless materials such as, for example, carbon dioxide and water, may be classified into two broad areas: (1) catalytic conversion and (2) non-catalytic or thermal conversion. In the catalytic method, the exhaust gases leaving the engine are passed, with or without heating or cooling, into contact with a suitable conversion catalyst and the conversion products of the resulting reactions are then discharged into the atmosphere. In general, the preferred conversion reactions involve more or less complete oxidation of combustibles, and to achieve this end it is necessary to provide additional oxygen, obtained from air or other oxygen-containing gas, in the exhaust gases prior to contact with the catalyst. In the thermal method, the exhaust gases are simply heated to, or maintained at, a sufficiently high temperature in the presence of oxygen, so as to burn without utilization of a catalyst. With either method it is necessary to provide at least a stoichiometric amount, and preferably an excess amount, of oxygen or air in the exhaust gases. It is not desirable to manipulate the carburetor in order to provide such excess air since this would materially reduce the efficiency and power output of the engine; therefore, it is necessary to separately add the requisite amount of air to the exhaust gases at a point between the exhaust valve ports of the engine and the catalytic or thermal conversion zone located downstream therefrom. Such excess air is often referred to as "secondary air" as distinguished from the primary air drawn through the carburetor and employed to support combustion of the fuel within the engine cylinders proper.

A common means of injecting secondary air into the exhaust gas stream is to employ an engine-powered air pump driven by the fan belt or otherwise operatively connected to the crankshaft. The quanity of air required ranges from about 5 to about 50 pounds per hour at discharge pressures of from 1 to 10 p.s.i.g., depending upon the size of the engine and its operational mode at any instant of time, i.e., whether the engine is idling, accelerating, cruising or decelerating. Air pumps heretofore employed by the prior art for this service fall into the category of centrifugal fans or blowers, diaphragm pumps, piston pumps, large vane pumps, and the like, which are capable of moving a large volume of air at low discharge pressures. These machines are characterized by relatively large physical size in relation to capacity. One major difficulty encountered with many present-day automobiles is lack of space for installing such a large size air mover in a place where it can be conveniently driven.

The present invention circumvents the space limitation problem by employing a small volume, relatively high pressure air compressor which discharges through a jet pump or aspirator taking suction from the atmosphere and which in turn connects with the engine exhaust system. The aspirator operates to multiply severalfold the air throughput of the compressor and to reduce its high discharge pressure to a substantially lower pressure which is yet adequate to insure a steady flow of air into the exhaust system. The use of a small volume, high pressure compressor results in a much smaller unit which can be easily mounted so as to be driven by the fan belt or, for example, from an extension of the generator shaft. The types of compressors most suited for this service are positive displacement rotary machines such as the gear pump, lobe pump, sliding vane pump, bucket-van pump, cam pump, and the like. The compressor preferably should have an air capacity of 1–10 pounds per hour at a discharge pressure of from about 50 to about 200 p.s.i.g., and the aspirator is sized to multiply the compressor throughput by a factor of from about 3 to about 10, while reducing the pressure of the total secondary air to 1–10 p.s.i.g. as required to overcome exhaust system back pressure.

A broad embodiment of this invention relates to fluid transport apparatus comprising mechanical fluid pumping means having a suction port and a discharge port; aspiration means having a motive fluid inlet port, an aspirated fluid inlet port, and a combined fluid outlet port; conduit means connecting said discharge port with said motive fluid inlet port; and means for maintaining said suction port and said aspirated fluid inlet port in fluid communication with a common reservoir of fluid.

A more specific embodiment of this invention is directed to apparatus for injecting air into the exhaust gas system of an internal combustion engine which comprises in combination an air compressor driven by said engine and having a suction port and a discharge port; an aspirator having a motive fluid inlet port, an aspirated fluid inlet port, and a combined fluid outlet port, said suction port and said aspirated fluid inlet port being in fluid communication with the surrounding atmosphere; conduit means connecting said discharge port with said motive fluid inlet port; and conduit means connecting said combined fluid outlet port with said exhaust gas system.

Figure 2:
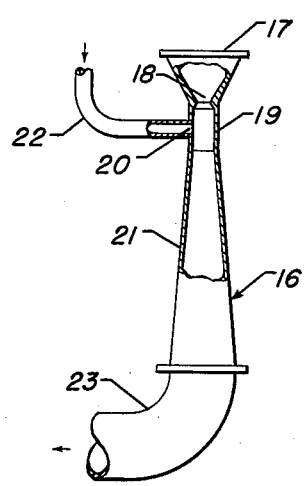

The structure and operation of the invention may best be described in connection with the drawings which are presented as illustrating the best mode of practicing the invention, but are not intended to be limiting upon its broad scope. FIGURE 1 is an elevation view of a typical automotive type internal combustion engine showing the general features of the present invention. FIGURE 2 is a sectional elevational view of a suitable aspirator designed for use in conjunction with the high pressure compressor.

In FIGURE 1, there is shown an automotive type internal combustion engine 1 which is provided with carburetor block 2 and a carburetor air filter 4 having an air intake pipe 3. The engine is further provided with an exhaust manifold 5 which discharges into exhaust pipe 6. Exhaust pipe 6 is connected to a suitable exhaust gas converter 7 which may be a non-catalytic or thermal type afterburner, or a catalytic muffler containing a suitable oxidation catalyst such as platinum-alumina, copper chromite, vanadium pentoxide and the like. Gaseous effluent from converter 7 is discharged to the atmosphere through tailpipe 8. An automotive type generator 9 is driven by fan belt 10. A small volume, high pressure rotary compressor 11 is attached to the rear of generator 9 by means of bolts 12, the compressor being driven by an extension of the generator shaft. Suction nozzle 13 of compressor 11 is connected by conduit 15 to carburetor block 2 at a point therein which is upstream from the fuel addition zone. Discharge nozzle 14 of compressor 11 is connected to aspirator 16, the internals of which are shown in detail in FIGURE 2, to which reference is now made.

In FIGURE 2, there is shown the internals of a suitable aspirator indicated generally at 16. Aspirators are well-known in the art of fluid transport and only a brief description of the principal elements thereof is necessary here. Aspirator 16 is provided with a motive fluid inlet port 17 which directs motive fluid through a convergent nozzle 18 which in turn discharges into a venturi-shaped diffuser section 21. The diffuser comprises an inlet throat section 19 having a cross-sectional area smaller than the aspirator outlet and a gradually expanding section downstream therefrom to increase the area up to that of the aspirator outlet. An aspirated fluid inlet port 20 communicates with the interior of the aspirator at a point downstream from and adjacent to the opening of nozzle 18.

With reference again to FIGURE 1, a conduit 22 connects aspirated fluid inlet port 20 with conduit 15. The combined fluid outlet port of aspirator 16 is connected via conduit 23 and throttle valve 24 to exhaust line 6 at a point therein upstream from converter 7. Throttle valve 24 is actuated by a vacuum-responsive bellows-type operator 25 which in turn is connected by control line 26 to the intake manifold of engine 1. The purpose of valve 24 is to restrict the quantity of secondary air delivered to the conversion zone under deceleration conditions when the engine speed is momentarily high while the rate of flow of the exhaust gases is low, thereby preventing overdilution of the converter charge with air.

The operation of the apparatus is as follows: a stream of air from the surrounding atmosphere is drawn in through intake pipe 3 and through carburetor air filter 4. A slipstream of filtered air is taken off through conduit 15 and a minor portion thereof is admitted to suction port 13 of compressor 11, the balance thereof being directed through bypass conduit 22. This minor portion of air is compressed to an appropriately high pressure, for example, to about 100 p.s.i.g., and is discharged through discharge port 14 of compressor 11 into and through aspirator 16. The stream of compressed air is passed through convergent nozzle 18 and is thereby formed into a high velocity jet at substantially reduced pressure which passes through throat 19 and into diffuser 21, creating a region of low pressure in throat 19, into which air is aspirated through conduit 22; diffuser 21 functions to mix the streams of air from the compressor and from conduit 22 and to convert the residual velocity of the mixture into pressure. The combined streams of air from compressor 11 and from bypass conduit 22 are discharged through conduit 23 and valve 24 into exhaust pipe 6. When the engine is undergoing rapid deceleration, there is a tendency for excessive air to be delivered to converter 7; this behavior may be corrected by means of throttle valve 24 connected as indicated. The high intake manifold vacuum produced by deceleration causes throttle valve 24 to assume a more closed position, and the flow rate of secondary air will accordingly be reduced during periods of deceleration. In the event that valve 24 should shut off completely, the compressor will not be damaged by overpressure since the direction of flow through conduit 22 will reverse and air will simply be circulated in a closed path through the compressor.

As a further example of the operation of this invention, an 8-cylinder, gasoline-powered internal combustion engine, fitted out with the air injection system of FIGURE 1, is operated at a speed of 2500 r.p.m. under a load of 40 brake horsepower. The compressor furnishes an air flow of 6 pounds per hour at a discharge pressure of 100 p.s.i.g., an additional 30 pounds per hour of air is drawn through the aspirated fluid inlet port of the aspirator, and a total secondary air flow of 36 pounds per hour is delivered to the engine exhaust line under a pressure of 1.1 p.s.i.g. The engine exhaust gas flow rate is 350 pounds per hour and the total mixed gases (secondary air-exhaust gas) are charged to the conversion zone at the rate of 386 pounds per hour. Thus, the aspirator effects a 6-fold increase in the quantity of air delivered by the compressor at the expense of a 7:1 decrease in the discharge pressure of the compressor.

The above-described apparatus provides a means of utilizing the carburetor air filter to insure a clean supply of secondary air to the conversion zone. It will be appreciated by those skilled in the art that separate air filters of the replaceable cartridge type may be installed individually at the compressor suction port and at the aspirated fluid inlet port, or a single auxiliary air filter may be installed on the common suction line 15. In the event that it is not deemed necessary to filter the secondary air, compressor suction port 13 and aspirated fluid inlet port 20 may simply be left open to the atmosphere.

Various other modifications to the above-described apparatus will suggest themselves to those skilled in the art. For example, it is not necessary that conduit 22 be connected to conduit 15, but rather conduit 22 may simply be a short length of open-ended tubing extending upwardly into the engine compartment so as to avoid entrainment of road dirt and water. The aspirator need not be close-coupled to the compressor as indicated in FIGURE 1, but where space considerations so require, the aspirator may be located at any convenient position, such as under the engine block itself or under the floor board of the vehicle; since the compressor flow is relatively low and at high pressure, the compressor discharge port may be connected to the aspirator inlet by means of small diameter tubing, for example, ¼" O.D. or ½" O.D. copper tubing.

Although the present invention relates primarily to the injection of air into the exhaust gas stream of an internal combustion engine, the utility of the invention is not so limited. Certain exhaust gas oxidation catalysts exhibit improved activity and/or stability, with respect to the oxidation of hydrocarbons and carbon monoxide generated by the incomplete combustion of leaded gasolines, when various chemical additives are injected into the exhaust gas stream ahead of the conversion zone. For example, it has been found that the stability of a platinum-alumina catalyst is substantially increased by adding to the exhaust gas a minor proportion of hydrogen halide or halogenated hydrocarbon such as ethylene dibromide or tertiary butyl chloride. Accordingly, the instant invention may be employed for this purpose. A storage tank containing the desired additive may be connected to the compressor suction port or to the aspirated fluid inlet port and the additive permitted to pressure out or vaporize at a controlled rate into the secondary air stream; alternatively, high pressure air from the compressor discharge may be bubbled through a vaporization chamber containing a bath of liquid additive and the resulting effluent from the vaporization chamber, comprising a mixture of air and additive, may then be passed to the aspirator.

I claim as my invention:

In an internal combustion engine having an exhaust manifold and an exhaust pipe having its inlet end connected directly to said manifold, the combination of apparatus for introducing secondary air to said exhaust pipe comprising mechanical fluid pumping means driven by said engine and having a suction port and a discharge port, an aspirator disposed externally of said exhaust pipe and having a motive fluid inlet port, an aspirated fluid inlet port, and a combined fluid outlet port, said inlet ports and said outlet port being outside the exhaust pipe and said suction port and said aspirated fluid inlet port being in fluid communication with the surrounding atmosphere, conduit means connecting said discharge port with said motive fluid inlet port, and conduit means connecting said combined fluid outlet port with said exhaust pipe at a point downstream of said inlet end of the latter.

References Cited in the file of this patent

UNITED STATES PATENTS

| | | |
|---|---|---|
| 1,594,906 | Gross | Aug. 3, 1926 |
| 2,482,754 | Flint | Sept. 27, 1949 |
| 2,547,454 | Flint | Apr. 3, 1951 |
| 2,667,031 | Ryder | Jan. 26, 1954 |
| 2,795,103 | Jenison | June 11, 1957 |
| 2,851,852 | Cornelius | Sept. 16, 1958 |